(12) United States Patent
Chiang

(10) Patent No.: US 8,614,676 B2
(45) Date of Patent: *Dec. 24, 2013

(54) USER MOTION DETECTION MOUSE FOR ELECTRONIC DEVICE

(76) Inventor: Kuo-Ching Chiang, Linkou Township, Taipei County (TW)

( * ) Notice: Subject to any disclaimer, the term of this patent is extended or adjusted under 35 U.S.C. 154(b) by 985 days.

This patent is subject to a terminal disclaimer.

(21) Appl. No.: 11/889,602

(22) Filed: Aug. 15, 2007

(65) Prior Publication Data

US 2008/0266257 A1 Oct. 30, 2008

Related U.S. Application Data

(63) Continuation-in-part of application No. 11/790,238, filed on Apr. 24, 2007.

(51) Int. Cl.
*G06F 5/08* (2006.01)
(52) U.S. Cl.
USPC ..... 345/163; 455/552.1; 455/557; 455/414.1; 455/414.4; 715/863; 345/156

(58) Field of Classification Search
USPC ......... 455/552.1, 557, 414.1, 414.4; 715/863; 345/156
See application file for complete search history.

(56) References Cited

U.S. PATENT DOCUMENTS

| | | | |
|---|---|---|---|
| 6,661,454 B1 * | 12/2003 | Hwang et al. | 348/231.1 |
| 6,730,900 B2 * | 5/2004 | Hsish et al. | 250/208.1 |
| 2004/0169637 A1 * | 9/2004 | Sato | 345/156 |
| 2005/0057489 A1 * | 3/2005 | Kung et al. | 345/156 |
| 2006/0026535 A1 * | 2/2006 | Hotelling et al. | 715/863 |
| 2006/0033701 A1 * | 2/2006 | Wilson | 345/156 |
| 2006/0097991 A1 * | 5/2006 | Hotelling et al. | 345/173 |
| 2006/0161871 A1 * | 7/2006 | Hotelling et al. | 715/863 |
| 2006/0250377 A1 * | 11/2006 | Zadesky et al. | 345/173 |

* cited by examiner

*Primary Examiner* — Kamran Afshar
*Assistant Examiner* — Shahriar Behnamian

(57) ABSTRACT

A mouse for an electronic device comprises a housing to receive component therein; a display attached on the housing for displaying, wherein the display includes image icon to perform pre-determined function; a user motion detecting device attached on the display for detection the motion of user finger; a controller received in the housing for generating a control signal in responsive to the user motion detection.

7 Claims, 11 Drawing Sheets
(4 of 11 Drawing Sheet(s) Filed in Color)

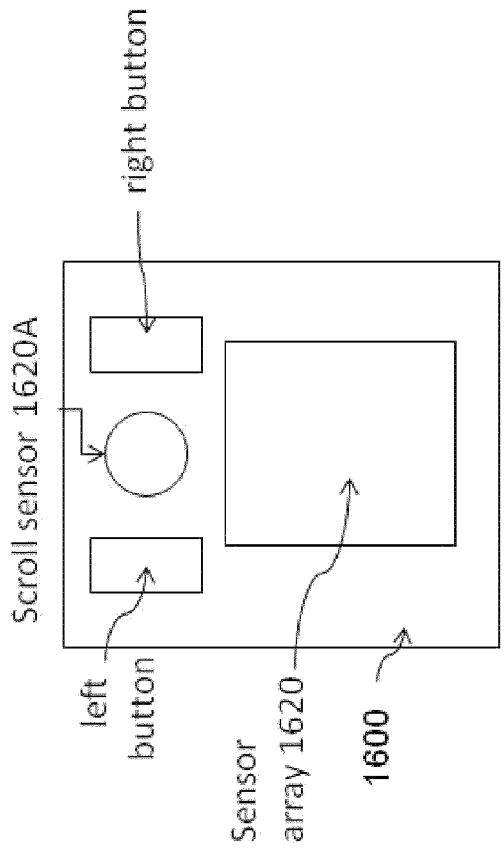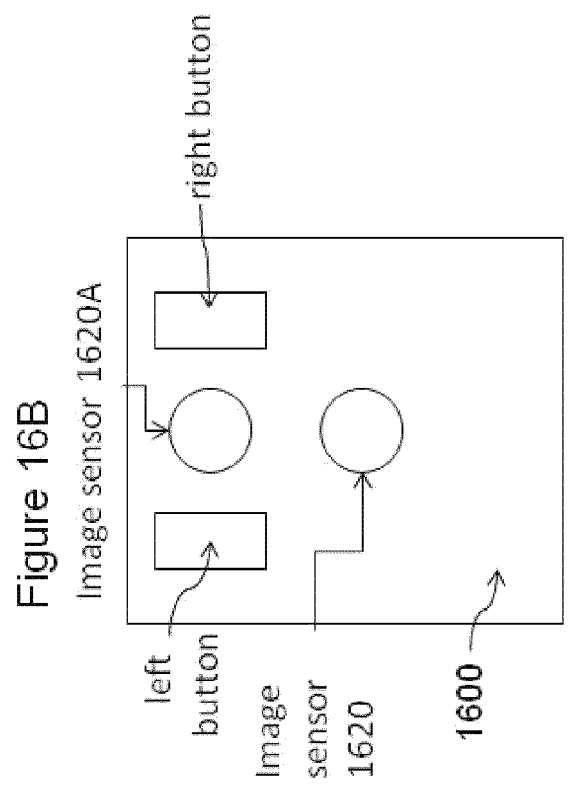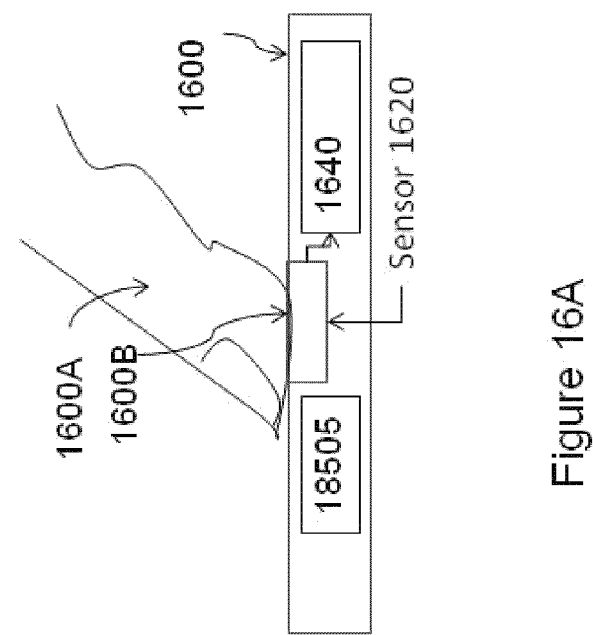

USER MOTION DETECTION MOUSE FOR ELECTRONIC DEVICE

The application is a continuation-in part application of Ser. No. 11/790,238, filed on Aug. 1, 2007, entitled "Method of Controlling an Object by User Motion for Electronic Device".

FIELD OF THE INVENTION

The present invention relates generally to a mouse, and more particularly to a slim mouse for electronic device.

BACKGROUND OF THE INVENTION

Portable computers and personal computer or smart phone have been widely used for each area. Laptop (notebook) and tablet style computers may be found in the work environment, at home or used during travel, perhaps as a result of their advantages, particularly when equipped with wireless communicating technology. Advantages such as low power consumption, small size, low weight make the portable computer available to nearly everyone everywhere. A variety of peripheral devices, such as a mouse, are necessary for these computers.

Conventionally, the mechanical mouse included a captured moving ball and encoder wherein movement of the ball generated an x, y directional signal to control the cursor. More recently, the optical mouse has been developed, the optical mouse technology bounced a focused beam of light off a highly reflective surface to a sensor. This caused a sensor to send a signal to the computer to trigger cursor movement.

SUMMARY OF THE INVENTION

The object of the present invention is to provide a mouse with user motion detection module.

A mouse for an electronic device comprises a housing to receive component therein; a user motion detecting device attached on the housing for detection the motion of user finger; a controller received in the housing for generating a control signal in responsive to the user motion detection. The user motion detecting device includes CMOS sensor, CCD or touch sensor array. The user motion includes finger motion. The mouse also includes a communication interface coupled to the controller. The communication interface includes USB, IEEE 1394, or fire wire, IEEE 802.11, WiFi, IR, WiMAX, or blue-tooth. The mouse further comprises a power supply coupled to the controller and it could be provide by wired, wireless, battery or solar energy. The power supply is provided by wired wireless, battery or solar energy.

A mouse for an electronic device comprises a housing to receive component therein; a display attached on the housing for displaying, wherein the display includes image icon to perform pre-determined function; a user motion detecting device attached on the display for detection the motion of user finger; a controller received in the housing for generating a control signal in responsive to the user motion detection.

The user motion detecting device includes touch sensor array. The mouse also includes a communication interface coupled to the controller. The communication interface includes USB, IEEE 1394, or fire wire, IEEE 802.11, WiFi, IR, WiMAX, or blue-tooth. The mouse further comprises a power supply coupled to the controller and it could be provide by wired, wireless, battery or solar energy. The power supply is provided by wired wireless, battery or solar energy. The display include LCD, FED, OLED, EL, electronic ink or electronic paper. The user motion detecting device is based on capacitive sensing, resistive sensing, surface acoustic wave sensing, or thermal sensing.

The patent or application file contains at least one drawing executed in color. Copies of this patent or patent application publication with color drawing(s) will be provided by the office upon request and payment of the necessary fee.

FIG. 15-FIG. 15-2 show a flow chart according to the present invention.

DETAILED DESCRIPTION

The present invention relates generally to a computing or portable device. The device includes but not limited to cellular phone, PDA (personal digital assistant), smart phone, notebook, digital still camera, digital video camera, medium player (MP3, MP4), GPS and the equivalent thereof.

Figure 1:
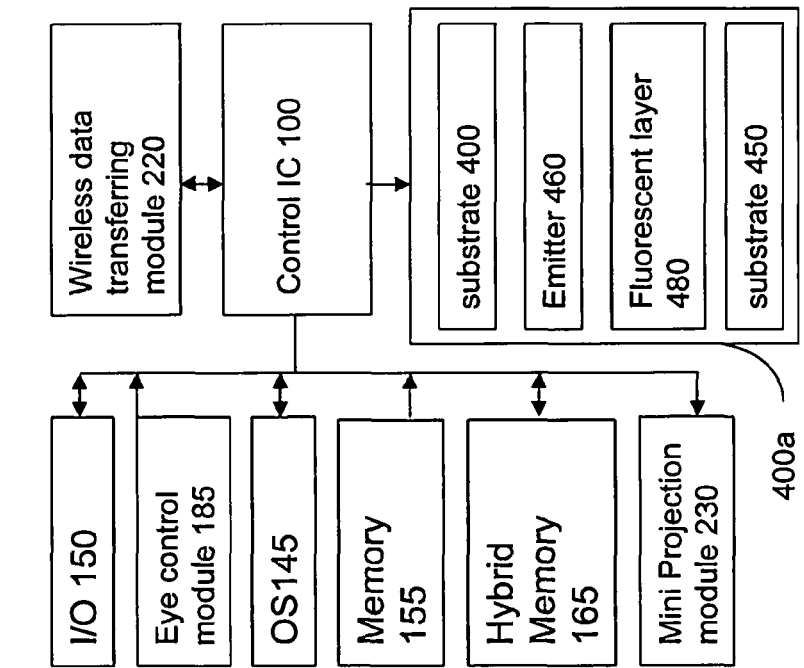
FIG. 1-2 shows a diagram of a portable device according to the present invention.
Figure 2:
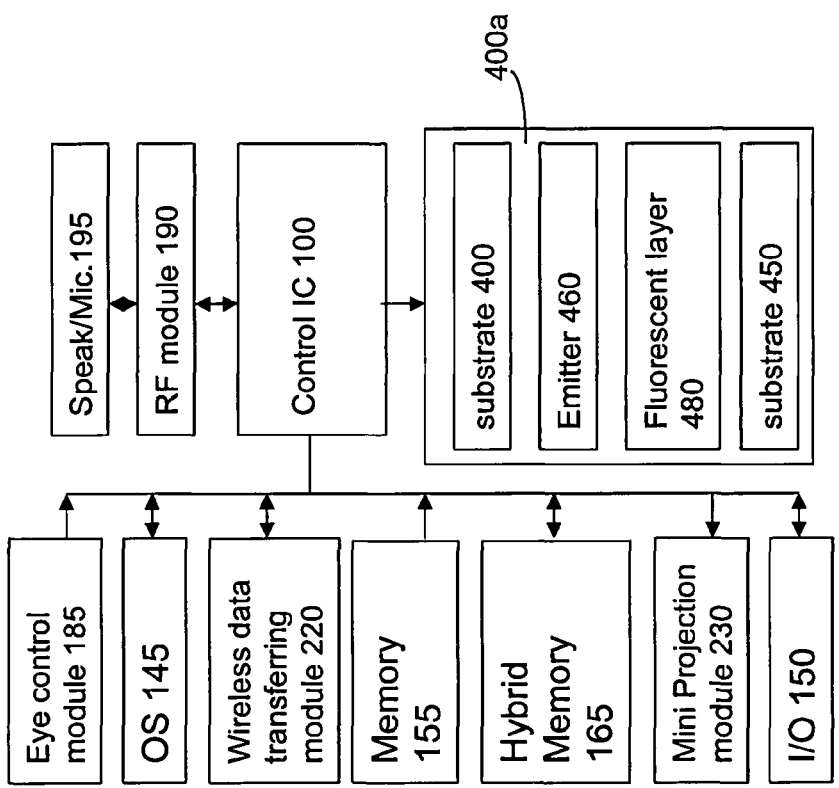

FIG. 1 is a diagram illustrating main components of a portable communication device using a panel with emitters and transparent substrate according to an embodiment of the present invention. The embodiment, as shown in FIG. 1 and FIG. 2, the device 20 includes a RF module 190. As know in the art, the RF module 190 includes antenna. This antenna is connected to a transceiver, which is used to receive and transmit signal. AS known, the RF module 190 further includes CODEC, DSP and A/D converter as well. Due to the RF module is not the feature of the present invention, therefore, the detailed description is omitted. Other major components between device 10 and 20 are similar, therefore, the same reference numbers refers to similar component, however, the version, grade and performance maybe different. The present invention includes a central control IC 100, an input and output (I/O) unit 150, OS 145, hybrid memory 165, the device 10 or 20 may includes other memory 155 such as ROM, RAM and FLASH memory. The RF module may perform the function of signal transmitting and receiving, frequency synthesizing, base-band processing and digital signal processing. If the portable device is cellular, SIM card hardware interface is provided for receiving a SIM card. Finally, the signal is send to the final actuators, i.e. a loudspeaker and a microphone 195 or I/O 150.

The present invention further includes a wireless transmission/receiving module 220 coupled to the control IC 100. The transmission/receiving module is compatible with blue-tooth, home-RF, 802.11x, WiFi, WiMAX standard or their higher version. The transmission domain (the air) by nature is not secured and therefore encryption maybe essential in the wireless transport networks. In one embodiment, pair-wise encryption/decryption between every neighboring wireless network device of a wireless transport network is well-known in the art. A data frame that leaves from one wireless device from one end of a wireless transport network to the other end of the same network might need several encryptions and decryptions before it reaches its final destination. A mini projection module 230 maybe incorporated into the portable device, the mini projection module 230 may refer to the co-pending application Ser. No. 11/734,175, filed by the same inventor of the application.

Figure 4:
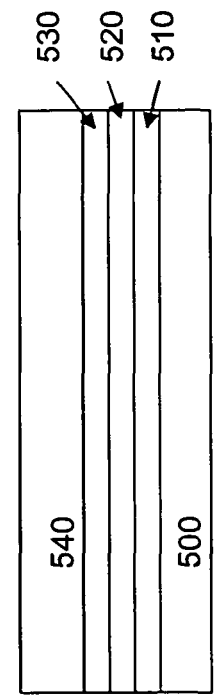
FIG. 3-4 shows a diagram of a portable device according to the present invention.
Figure 3:
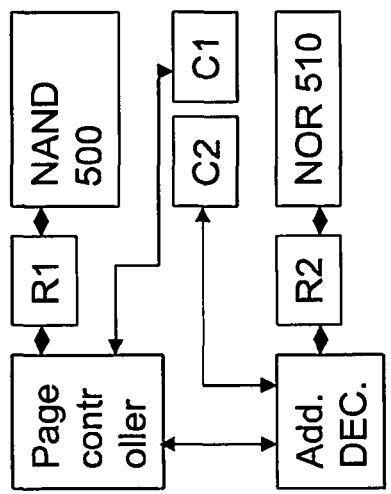

Optionally, the present invention also provides a hard disk drive incorporated with a Flash memory within one single unit, as shown in FIG. 3 to have the benefits of both. The hard disk drive includes a control unit 400 coupled to a magnetic disk module having spindle driver, reading/writing head mechanism and so on. This is well-known in the art, the description is omitted. A flash controller 440 is coupled to the control unit 400 and a nonvolatile memory 430 is coupled to the flash controller 440. An application 450 is coupled to the control unit to execute the instruction. The hybrid hard disc drive incorporates the flash memory into the device to yield the benefit of high-speed access and low power consumption. The hard disk drive maybe incorporated into portable media player, cellular, notebook or PDA. A controller 440 is connected to the flash memory 430 to operate the mode under instruction or command. The operation mode includes read mode, write mode, erase mode, and programming mode. Further, the controller 440 maybe integrated into the control unit 400 under the knowledge and technology of integrated circuits. An embedded system 470 is optionally stored in the erasable/programmable storage medium (flash, ROM or hard disk). It could be an application, software or a list of computer-executable instructions. Alternatively, the ROM 480 may be embedded in the control unit. The data coded in the ROM will not be erased by the user. The embedded system 470 could be provided for a computer or device to execute predetermined function such as operating some application, booting the device, auto backup or auto-run file. In general, after a device is power on, basic input/output system will perform a boot sequence before invoking the OS. Basic input/output system is set in the ROM. The programmer or instruction can be set in the embedded system to determine what type of data will be stored into what type of storage (flash or hard disk). It could be used for different type of volatile memory having NOR device and NAND device (FIG. 4). A hybrid memory scheme may refer to the above co-pending application filed by the identical inventor of the application, entitled "Monitoring System with a Wireless Transmitting/Receiving Module". The co-pending application is incorporated herein for reference. Under such configuration, the computing device, for example, personal computer, notebook, may omit the hard disc drive. The scheme uses NOR device to act and replace the role of hard disc to store operation system and yield the benefit of high speed operation and low power consumption, while the data is stored in the NAND device. The operation speed will be higher than the one employing hard disc. In one embodiment, the embedded system is coupled to the control unit to determine or assign the duty of the magnetic disk module 420 and the nonvolatile memory 430. The flash benefits high speed performance, low power consumption while hard disk drive yields lower cost and high capacity. The storage architecture refers to Complementary Storage Device (CSD). The CSD has the benefits of the both type of memory. The manufacture may reduce the cost and increase the performance by incorporating the two kind of memory with an optimized memory ratio between the flash memory and the magnetic memory.

Figure 5:
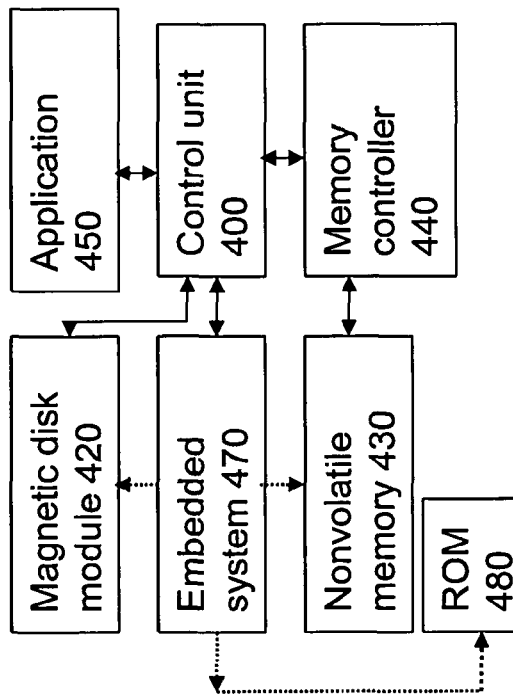
FIG. 5 shows a diagram of field emitter device according to the present invention.

Almost all conventional devices include an antenna located within the portable device, the signal receiving performance is poor due to EM shielding effect generated by the shield, circuits, circuit board and other components. If the antenna to the signal is "transparency", the performance will be improved. Therefore, in another aspect of the present invention is to provide an antenna located corresponding to a substantially transparent panel to minimize the EM shielding effect, thereby improving signal receiving/transmitting performance. Preferably, at least one transparent antenna is attached on the substantially transparent panel to minimize the EM shielding effect. As seen in FIGS. 1 and 2, a substrate 400 is provided and transparent electrodes 420 are formed on the glass substrate 400. The substrate 400 could be silicon, glass, quartz or the like. The embodiment of the present invention is shown in FIG. 5, it is a cross-sectional view of the field emission device according to the present invention. As seen in FIG. 5, a transparent substrate 400 is provided and transparent electrodes 420 are formed on the glass substrate 400. The transparent electrodes 420 may be made of indium tin oxide (ITO) and may be used as the emitter electrodes. Stacked gate 410 that cover a portion of the transparent electrodes 420 are formed on the glass substrate 400. Emitters 460 that emit electrons are formed on a portion of the transparent electrode 420. Each stacked gate 410 includes a mask layer 440 that covers a portion of the transparent electrodes, and is formed by UV photolithograph mask. The mask layer 440 is preferably transparent to visible light, but opaque to ultra violet rays and can be made of an amorphous silicon layer. The silicon layer will be transparent when the thickness is thin enough. A stacked gate 410 structure includes first insulating layer/a gate electrode/a second insulating layer/focus gate electrode, sequentially formed over the substrate. The gate insulating layer is preferably a silicon oxide thin film with a thickness of 2 mu.m or more and the gate electrode is made of chrome with a thickness of about 0.25.mu.m. The gate electrode is used for extracting an electron beam from the emitter. The focus gate electrode performs as a collector for collecting electrons emitted from emitter so that the electrons can reach a fluorescent film 480 disposed above the emitter 460. If the device is used for display, the substrate can be silicon or transparent substrate. Referring to FIG. 5, a front panel (substrate) 450 is disposed upward and above the stacked gate. A variety of visual images are displayed on the front panel 450. A fluorescent film 480 is attached to a bottom surface of the front panel 450 that faces the stacked gate and a direct current voltage is applied to the fluorescent film 480 to emit color for display. The fluorescent substance may emit color light by mixing the emitted light if the thin film with R, G, B fluorescent substances. Preferably, the fluorescent substances emit red, green, and blue visible light when excited by the electron beam is evenly distributed on the fluorescent film 480. Spacer separating the front panel 450 from the stacked gate is a black matrix layer and is not shown for convenience. Due to the thin film display if formed with thinner thick and the power consumption is lower than LCD, the present invention may provide smaller size, lighter weight device. The life time of battery may last longer. The field emission device does not require complicated, power-consuming back lights and filters which are necessary for LCD. Moreover, the device does not require large arrays of thin film transistors, and thus, a major source of high cost and yield problems for active matrix LCDs is eliminated. The resolution of the display can be improved by using a focus grid to collimate electrons drawn from the microtips. Preferably, the emitter includes a carbon nanotube emitter to further reducing the device size. Further, the display may omit the liquid crystal material. Further, the field emission display does not require the S/D regions which are required by TFT for LCD.

Figure 6:
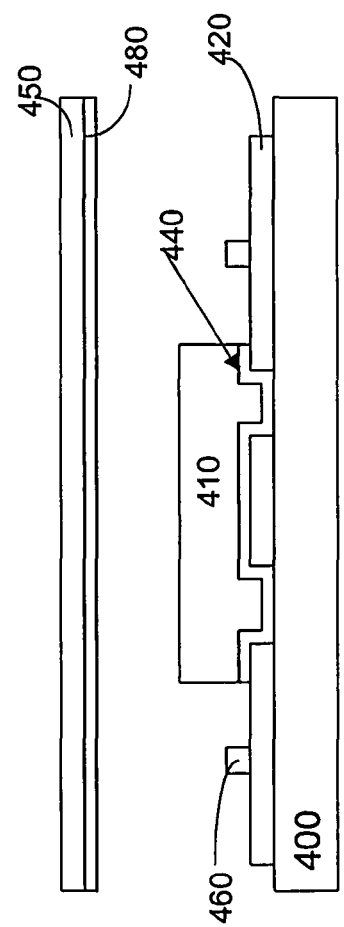
FIG. 6 shows diagram of a EL according to the present invention.

In another embodiment, the display is shown in FIG. 6. The display includes a transparent electrode 510 on a transparent substrate 500. A fluorescent film or power 520 is attached to an upper surface of the lower transparent electrode 510. Preferably, the fluorescent substance emits color light. The present invention includes three such devices that separately display image in red components, green components, and blue component. Each irradiates single color light. Different powder will emit different color. An upper transparent electrode 530 is formed on the fluorescent film or power 520. A second transparent substrate 540 is formed on the transparent electrode 540. A bias is applied on the electrodes to inject hole and electron, thereby exciting the fluorescent substances by the combination of the electron and hole to emit red, green, or blue visible light depending on the compound of the fluorescent substances. The elements may refer to ELP.

Figure 7:
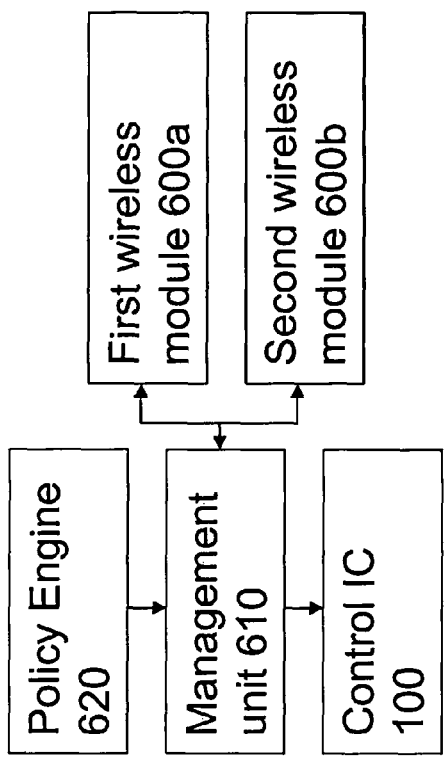
FIG. 7 shows a diagram of dual wireless module according to the present invention.

In another embodiment, the wireless data transferring module 220 includes dual mode module. Please refer to FIG. 7, in one case, the wireless data transferring module 220 includes a first and second wireless module 600*a* and 600*b* for wireless transmission. The dual modules 600*a* and 600*b* are coupled to a management unit 600 to manage the dual modules according to the policy set in a policy engine 610. For example, the policy in the policy engine 610 includes at least the transmission priority policy to determine which module will be the default module to receive/transmit data. It also includes the switching condition for switching there between. For example, the signal strength is one of the facts for switch condition. It also allows the user to set or alter the condition via user interface. The first and second wireless module maybe one of the following module: blue-tooth, 802.11x, WiFi, WiMAX, 3G standard or their higher (update) version. Preferably, the first wireless module is WiFi and the second wireless module is WiMax. The present invention may yield the benefits of both. For example, the access range of WiFi is shorter than WiMax, but it consumes lower power. If within the office area, the AP for WiFi may be employed to prevent others outside the office from accessing the server of the office. In another aspect, if the user would like to access or remote control a terminal device located at several miles away, the WiMax is chosen. The WiFi benefits security, low power consumption while WiMax yields long range and high bandwidth. The module architecture refers to dual wireless module (DWM). The DWM has the benefits of the both type of module. The first wireless module is compatible to a first communication protocol, while the second one is compatible to a second communication protocol. The manufacture may increase the performance by incorporating the two kind of wireless module memory with an optimized configuration. The protocol maybe adapted to wireless local area network or wireless mediate area network.

From above, the thick and complicated LCD panel is removed, thereby reducing the thickness of the portable device and a lot of elements such as color filter, LC material, back light module are also skipped from the present invention. Furthermore, due to the substrate 400, 450 could be formed by glass, quartz or the like, therefore, the present invention may offer unexpected and funny visual effect. Under the sleep mode or off state of the device, the panel is substantial transparent, while the device is not operation or standby, or at the sleep mode, the panel may acts as digital photo album due to the panel is transparent. Further, the user may alter the color, image pattern displayed on the panel when the device is in the sleep mode or off-state. The user may determine the pattern and image for the panel cover. Furthermore, a transparent antenna may be attached on the transparent panel to provide better signal transmission due to EM shield effect of the antenna will be minimized while the antenna is not set within the device. In this case, the antenna is composed by a material includes oxide containing metal or alloy, wherein the metal is preferable to select one or more metals from Au, Zn, Ag, Pd, Pt, Rh, Ru, Cu, Fe, Ni, Co, Sn, Ti, In, Al, Ta, Ga, Ge and Sb. Some of the transparent material includes oxide containing Zn with Al2O3 doped therein.

Figure 8:
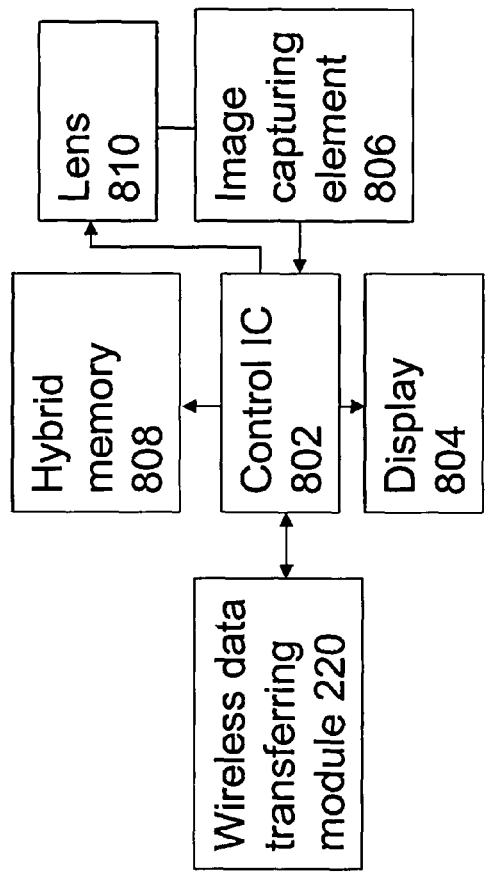
FIG. 8 shows a diagram of digital camera according to the present invention.
Figures 9, 10:
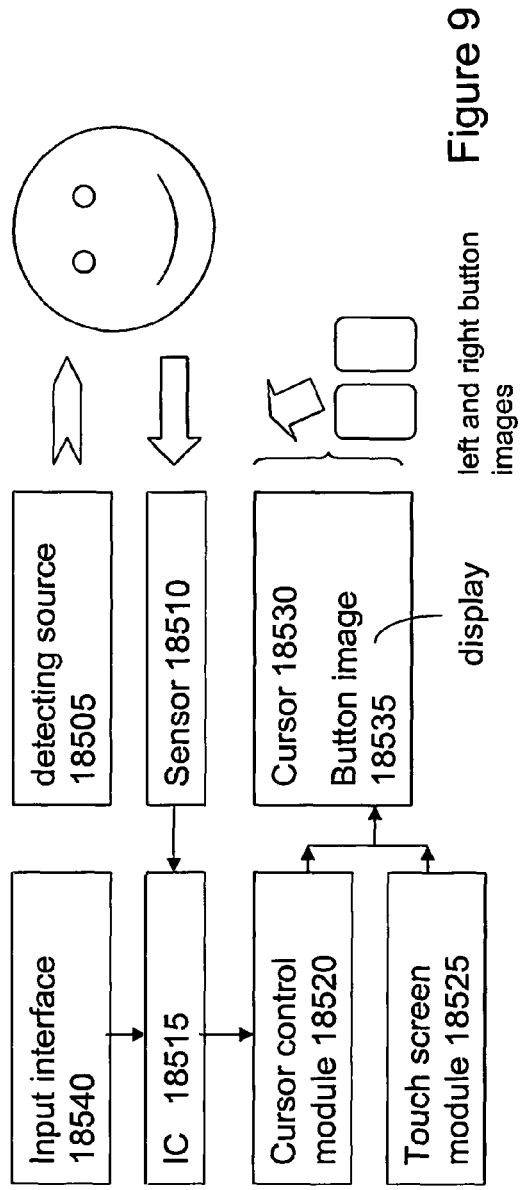
FIGS. 9, 10, 11 and 12 show a diagram of eye control module according to the present invention.

Further, referring to FIG. 8, the wireless transferring module 220 and hybrid memory maybe employed by a digital camera or digital video camera. Preferably, the device includes a main body having a control IC 802; a display 804 formed on the main body and coupled to the control IC 802; an image capture element 806 formed within the main body and coupled to the control IC 802; the hybrid memory 808 is coupled to the processor; a lens mechanism 810 is formed on the main body, coupled to the control IC 802 and corresponding to the image capture element 806; the wireless transferring module is coupled to the processor for data transferring with external device.

If the present invention is employed for medium player such as MP3 player, MP4 player, the player includes an analog/digital (A/D) converter for converting analog audio signals into digital audio signals. The analog audio signals can come from an audio source coupled to player. A digital signal processor (DSP) or an audio and/or video driving module, for instance MP3, MP4 codec, are coupled to A/D converter to receive the digital audio signals. In one embodiment, MP3 or MP4 codec executes a firmware that includes a MPEG audio layer (e.g., MP3, MP2, or both) codec or video codec (e.g., MP4), and DSP executes a firmware that includes a different type of audio codec (e.g., WMA, ACC, or both). In one embodiment, the firmware for DSP also includes a video codec for encoding and decoding videos (e.g., MPEG-4 V1/V2/V3, DivX 3.11/4.0/5.0, Xvid, AVI/ASF, or any combination thereof). MP3 (or MP4) codec and DSP are coupled to a nonvolatile memory that stores the compressed audio data. The user can select an audio file from nonvolatile memory. DSP are coupled to an audio processor, which processes the digital audio signals according to default settings or user instructions. Audio processor is coupled to a digital/analog (D/A) converter, which converts the digital audio signals into analog audio signals for the user.

Figure 11:
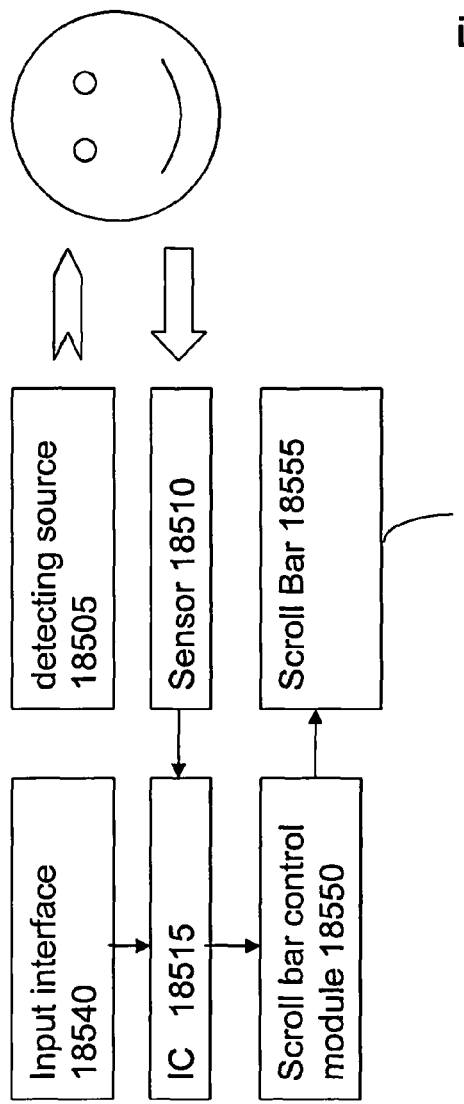

The present invention also provides a user control module to control the cursor without mouse or touchpad. A computing device comprises a display and a detecting device for detecting motion of a user. A movement information generating device is in responsive to the detection to generate an output signal, thereby generating movement information. A cursor control module is in responsive to the movement information to drive a cursor on the display corresponding to the movement information. Referring now to the drawings 1-2 and 9, there is shown in schematic form the basic components of the control module 185 incorporating the eye or face control module according to a preferred embodiment of the invention. The present invention includes a step of detecting the motion of a user. Preferably, the portion for detection could be eye, face or the like. The eye detection will be introduced as one of the examples to illustrate the features of present invention. The subject's face or eye is positioned relative to a sensor so that initially the subject's gaze is aligned along center line toward a pupil stimulus and fixation target. The eye control module 185 includes sensor and IC to detect eye motion and generate a control signal. The face motion could be used to practice the present invention. A detecting source 18505 is provided, the pupil of the eye(s) is (are) illuminated by the light source 18505, for example, an infrared ray (IR) or light emitting diode (LED). Preferably, dual source LED is used to project two spatially separated spots at the subject's pupil. The dual source LED is constructed by placing two LED side by side on the panel 400*a* of the portable device. Back light from the subject's eye is detected by a sensor 18510 directly or via other optical mirror or lens. Another method is to detect the user face motion or image by the sensor. The sensor 18510 could be optical sensor such as CMOS sensor or CCD. The outputs from the sensor 18510 are input to a processor or control integrated circuits 18515 to generate a control signal to a cursor control module 18520 for controlling a cursor on the display or panel. Eye detection method may refer to U.S. Pat. Nos. 7,130,447 and 5,943,754, both are assigned to The Boeing Company (Chicago, Ill.); U.S. Pat. No. 5,670,613, assigned to Pulse Medical Instruments, Inc. (Rockville, Md.). U.S. Pat. No. 5,422,690 discloses eye recognition and blink detection system. Preferably, the detecting source or the like scans the position of the pupil of eye(s). In this process the pupil is illuminated by a light source, so that the geometric form of the pupil can be portrayed clearly on the sensor. Alternatively, the image (face) change of the user could be detected by the present invention. By means of image processing, the pupil position information is evaluated and to determine where the eye in the display is looking. The control signal may drive the cursor to the position where the eyes are looking through cursor control module 18520. A buttons-image (or button-icons) may be generated along with the cursor by an image generator 18525. In one case, the image generator 18525 maybe a touch screen module which may generate touch screen image via well-known touch screen technology, in the manner, the user may "click on" the virtual bottom to input a command by means of "clicking" the touch screen. Alternatively, the click signal maybe input from input interface 18540 such as (the right and left buttons of) the keypad, vocal control through microphone, eye motion through the sensor 18510. In the case of vocal control, another software/hardware maybe necessary to process the steps of object selection through voice recognition hardware and/or software. For example, the action of close left eye refers to click left button while the action of close right eye refers to click right button. If both eyes close, it may refer to select one item from a list. The above default function may be practiced by a program and software. It should be understood by persons skilled in the art, the foregoing preferred embodiment of the present invention is illustrative of the present invention rather than limiting the present invention. Modification will now suggest itself to those skilled in the art. Under the method disclosed by the present invention, the user may move the cursor automatically without the mouse. Similarly, the control signal may be used to drive the scroll bar moving upwardly or downwardly without clicking the bar while reading document displayed on the screen, as shown in FIG. 11. Thus, the control signal generated by IC will be fed into the scroll bar control module 18550 to drive the scroll bar 18555 on the display moving upwardly or downwardly without the mouse or keypad. An eye controllable screen pointer is provided. The eye tracking signals are performed in a calculation by a processing means residing in a processor or integrated circuits to produce a cursor on the screen.

The sensor is electrically coupled to the controller (IC) 18515 via line. In a preferred embodiment, input controller 18515 comprises a semiconductor integrated circuit or chip configured to receive, interpret and process electrical signals, and to provide output electrical signals. Output signals from IC 18515 comprise signals indicative of movement of eye in a direction corresponding to the direction of actual cursor movement on the display intended by the user. The present embodiment takes into account a possible "dragging" situation that the user may be faced with. On occasion, some users have a need to "drag" an icon or other object from one area of the screen to another. On some computers, to accomplish this, the user must hold down the left click button and control the pointing device at the same time. If a touchpad is being used as the pointing device, and the object must a dragged a long distance across the screen, sometimes the user's finger may reach the edge of the touchpad. This situation is easily handled by the present invention. In such a situation, the controller may send the command (e.g. "click left mouse button", while dragging) repeatedly until the user's finger leaves a keyboard key (stops pressing a key). This permits dragging to be performed even after the user's finger leaves the touchpad. U.S. Pat. No. 7,165,225, assigned to Microsoft Corporation (Redmond, Wash.) disclosed "Methods and systems for cursor tracking in a multilevel GUI hierarchy". U.S. Pat. No. 7,095,447, assigned to Samsung Electronics Co., Ltd. (Kyonggi-do, KR) disclosed "OSD (on screen display) cursor display method and cursor image display apparatus". U.S. Pat. No. 7,137,068, assigned to Microsoft Corporation (Redmond, Wash.) disclosed "Apparatus and method for automatically positioning a cursor on a control". U.S. Pat. No. 6,774,886, assigned to Matsushita Electric Industrial Co., Ltd. (Osaka, JP) disclosed "Display system, cursor position indication method, and recording medium".

Therefore, the present invention providing a method of pointing a mark such as cursor, bar on a screen, the method includes detecting motion of a user (such as eye, face motion) and a sensor is in responsive to the detection of the eye to generate an output signal, thereby generating eye movement information; A cursor control module is in responsive to the user movement information to drive a cursor on the display corresponding to the movement information.

Similarly, the above method maybe used for face tracing in the field of digital still camera or digital video camera to tracking the face of the subject. By the almost same scheme, a face indication (or mark) module 18545 is responsive to the control signal to mark the face on the screen, thereby tracking the face for the digital camera. A digital camera comprises a control unit and a display; a detecting source for detecting eye of a user who is under photographed; a sensor in responsive to the detecting light back from the eye to generate an output signal, thereby generating eye movement information; a cursor control module in responsive to the eye movement information to drive a face indicator on the display corresponding to the eye movement information. The digital camera further comprises a wireless data transferring module coupled to the control unit for data transferring with an external device.

As aforementioned, the present invention discloses a user motion control module for computer or portable device. The module could be incorporated into the device adjacent to the keypad or keyboard area. Then, it may detect the figure motion of the user to move the cursor. Under some embodiments, the CMOS or CCD is used to detect the user motion including the facial expression, facial motion, or finger motion. In these applications, the sensor may capture the images and the controller may analysis the image change, thereby determining the cursor movement. The monitoring of and response to the user's facial expressions may also be used, for example, the user's motion could be monitored with a still camera or a video camera. It is unlike the conventional track ball, control panel for notebook. The sensitivity, resolution and controllability of the control panel are not so good. It should be noted, in the embodiment, the user motion detecting module is set adjacent to the keypad of notebook, or keyboard of the PC. The user motion detecting module detects the figure motion of the user by CMOS, CCD as aforementioned method. The resolution of the CMOS sensor may achieve higher than several Mega pixels. It may precisely reflect the finger (or face) motion of the user.

Figure 12:
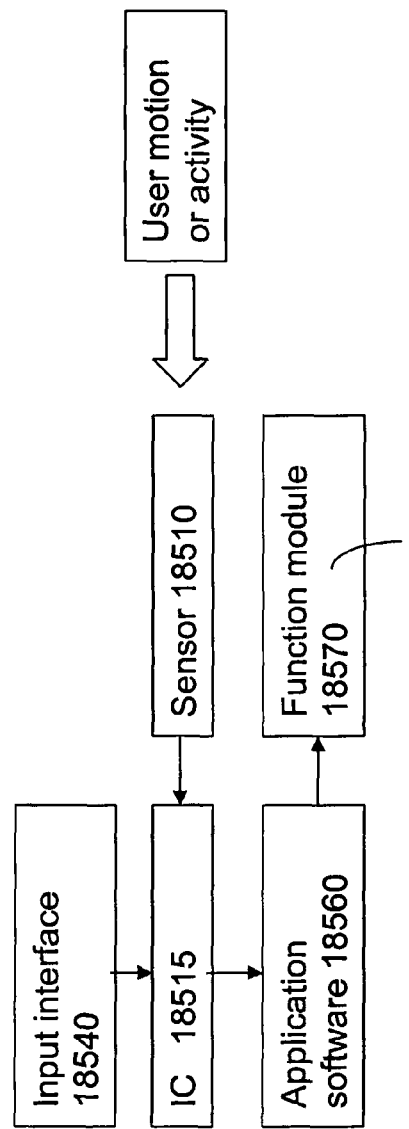

Alternatively, the cursor or items or function of computer (such as open file, close file, copy, cut, paste, etc.) may be controlled by the user activity, such as through the measurement of the activity of the human brain. The EEG (electroencephalograph) records the voltage fluctuations of the brain which can be detected using electrodes attached to the scalp. The EEG signals arise from the cerebral cortex, a layer of highly convoluted neuronal tissue several centimeters thick. Alpha waves (8-13 Hz) that can be effected if the user concentrates on simple mentally isolated actions like closing one's eyes; Beta waves (14-30 Hz) associated with an alert state of mind; Theta waves (4-7 Hz) usually associated with the beginning of sleep state by frustration or disappointment; and Delta waves (below 3.5 Hz) associated with deep sleep. Electromyographic (EMG) sensors are attached to the person's skin to sense and translate muscular impulses. Also Electrooculargraphic (EOG) signals have been sensed from eye movement. U.S. Pat. No. 7,153,279, assigned to George Washington University disclosed a brain retraction sensor. U.S. Pat. No. 7,171,262, assigned to Nihon Kohden Corporation disclosed a Vital sign display monitor. FIG. 12 is a diagram of an illustrative embodiment of the invention. The neural activity is tracked on neural activity detecting device 350. Preferably, the neural activity tracked includes EEG, EOG, EMG activity. The electrical signals representative of the neural activity are transmitted via wired or wireless to the control unit. If a predetermined signal is sensed by detecting device 350, the same EEG readings may be monitored. For example, the Alpha waves (8-13 Hz) can be effected if the user concentrates on some actions. Thus, if the concentration pattern is detected, the system is responsive to the signal and issue an instruction to take action to "open file", "close file", "copy file", "clicking", "paste", "delete", "space", or "inputting characteristics" etc. It should be noted that the state patterns of potential users may be monitored before the system is used.

The control IC 18515 is coupled to a signal receiver (not shown) which receives the neural signals from sensor 18510 by antenna or wired. An operating system runs on CPU, provides control and is used to coordinate the function of the various components of system and Application programs 18560. These programs include the programs for converting the received neural electrical signals into computer actions on the screen of display. By using the aforementioned devices, a user is capable of controlling the computer action by inputting neural information to the system through sensor. There will be described the setting up of a program according to the present invention for a user controlling a computer with sensed neural signals. A program is set up in the computer to use the electrical signals to control computer functions and/or functions controlled by the computer. A process is provided for predetermining the neural activity level (or pattern) that indicates the level of concentration of the user. A sensor is provided for monitoring a user's neural activity to determine when the predetermined neural activity level has been reached. The user's EEG pattern is determined. The user's neural activity is converted to electrical signals, and to give an instruction to execute a software functions. Before the user EGG pattern is determined, an image sensor (CCD or CMOS) is introduced to monitor the facial motion (or eye motion) to determine where the user looks at on the screen.

Therefore, the present invention discloses a method of controlling a cursor by user motion for a computing device comprising: detecting a user motion by detecting device; generating a control signal in responsive to the user motion detection; and controlling the cursor displayed on a display in responsive to the control signal. The user motion is detected by CMOS or CCD and the user motion includes facial motion, eye motion, or finger motion. The method further comprises a step of analysis the user motion before generating the control signal. The analysis includes the analysis of image change of the user motion.

A method of instructing an object by user activity for a computing device comprises detecting a user activity by a detecting device; generating a control signal in responsive to the user activity detection; controlling the object displayed on a display in responsive to the control signal to execute the instruction. The user activity is detected by CMOS or CCD and the user activity includes facial motion, eye motion, or finger motion. The analysis includes the analysis of image change of the user. Alternatively, the user activity is detected by EEG, EMG, or EOG sensor. The control signal includes cursor movement, character input, software application instruction.

A method of instructing an object by user activity for a computing device comprises detecting a user motion by a detecting device by CMOS or CCD; generating a control signal in responsive to the user motion detection; controlling the object displayed on a display in responsive to the control signal; detecting a EEG, EMG, EOG pattern by a EEG, EMG, EOG sensor to execute an instruction.

Figure 13:
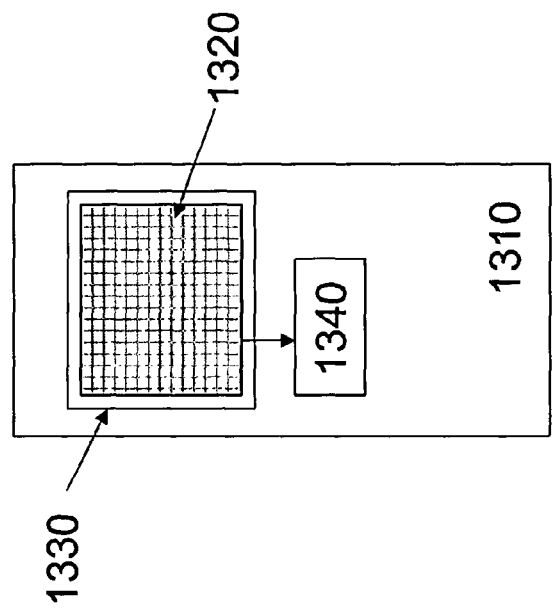
FIG. 13 shows a diagram of according to the present invention.

FIG. 13 is a simplified diagram of a portable electronic device 1310, in accordance with one embodiment of the present invention. The portable electronic device 1310 may for example be a hand held electronic device such as cellular phones, PDAs, media players, and GPS, or notebook, Tablet PCs and game players. The portable electronic device 1310 is configured with a sensor array on the display. The sensor array 1320 is configured to detect the presence of an object such as a finger as well as the location and pressure being exerted on the surface of the panel by the finger or palm of the hand. By way of example, the sensor array 1320 may be based on capacitive sensing, resistive sensing, surface acoustic wave sensing, thermal sensing and/or the like. The sensor array 1320 may further be based on pressure sensing such as strain gauges, force sensitive resisters, load cells, pressure plates, piezoelectric transducers or the like.

As shown in FIG. 13, the portable electronic device 1310 includes a housing and a display 1330 situated in a front surface of the housing. The portable electronic device 1310 also includes a touch sensing device 1320 is situated on the display. FIG. 13 is a perspective diagram of a hand held electronic device 1310, in accordance with one embodiment of the present invention. The hand held electronic device 1310 includes a housing that encloses internally various electrical components including integrated circuit chips. By way of example, the housing may contain a microprocessor (e.g., CPU), memory (ROM, RAM), a power supply (e.g., battery), a printed circuit board (PCB), a hard drive or other memory (e.g., flash) and/or various input/output (I/O) support circuitry. The hand held electronic device 1310 also includes a display 1330 disposed within and viewable through an opening in the housing. The display 1330 is typically placed on the front surface of the device 1310. The display 1330 provides visual information in the form of text, characters or graphics. By way of example, the display 1330 may correspond to a liquid crystal display (LCD), organic light emitting diodes (OLED), or a display that is based on electronic inks, electronic paper.

In order to generate user inputs, the hand held electronic device 1310 may include a sensing array 1320 that is a transparent input panel positioned in front of the display 1330. The sensing array 1320 generates input signals when an object such as a finger is moved across the surface of the sensing array 1320, for example linearly, radially, rotary, etc., from an object holding a particular position on the array 1320 and/or by a finger tapping on the array 1320. In most cases, the sensing array allows a user to initiate movements in a GUI by simply touching the display screen via a finger. For example, the sensing array 1320 recognizes the touch and position of the touch on the display 1330 and an interpreting controller 1340 of the hand held electronic device 1310 interprets the touch and thereafter performs an action based on the touch event. In accordance with one embodiment, the sensing array 1320 is a multi-touch sensing device that has the ability to sense multiple points of contact at the same time and report the multiple touches to the controller of the handheld electronic device. In one implementation, the sensing array 1320 is a multipoint capacitive touch screen that is divided into several independent and spatially distinct sensing points, nodes or regions that are positioned throughout the display. The sensing points, which are typically transparent, are dispersed about the sensing array with each sensing point representing a different position on the surface of the display. The sensing points may be positioned in a grid or a pixel array where each pixilated sensing point is capable of generating a signal. The signal is produced each time an object is positioned over a sensing point. When an object is placed over multiple sensing points or when the object is moved between or over multiple sensing point, multiple signals can be generated. The sensing points generally map the touch screen plane into a coordinate system such as a Cartesian coordinate system or a Polar coordinate system. An example of a multipoint capacitive touch screen may be found in U.S. patent Ser. No. 10/840,862, which is herein incorporated by reference.

The hand held electronic device 1310 may be designed to recognize gestures applied to the sensing array 1320 and to control aspects of the hand held electronic device 1310 based on the gestures. The gestures may be made through various particularly finger motions. The hand held electronic device 1310 may include a gesture operational program, which may be part of the operating system or a separate application.

In one embodiment, the sensing input device is mapped to the display. When mapped, points on the sensing input device coincide with points on the display, i.e., have the same coordinates (x and y). Therefore, when a user touches the sensing input device surface, it will appear as if the user is touching the image at the same location of the display. As shown, the sensing array 1320 is divided into several independent and spatially distinct sensing points (or regions) that are positioned within the respective component. The sensing points are generally dispersed about the respective component with each sensing point representing a different position on the surface of the component and thus the device 10. The sensing points may be positioned in a grid or a pixel array where each pixilated sensing point is capable of generating a signal. The number and configuration of the sensing points may be widely varied. The number and configuration of sensing points generally depends on the desired resolution of the touch sensitive surface and may be varied from spot to spot across the display to achieve any desired compromise between cost and functionality. In the case, a signal is produced each time the finger is positioned over a sensing point.

When an object is placed over multiple sensing points or when the object is moved between or over multiple sensing points, multiple position signals are generated. As should be appreciated, the number, combination and frequency of signals in a given time frame may indicate size, location, direction, speed, acceleration and the pressure of the finger or palm on the surface of the device. By way of example, the control system may be a microcontroller located within the housing of the device 1310.

Figure 15:
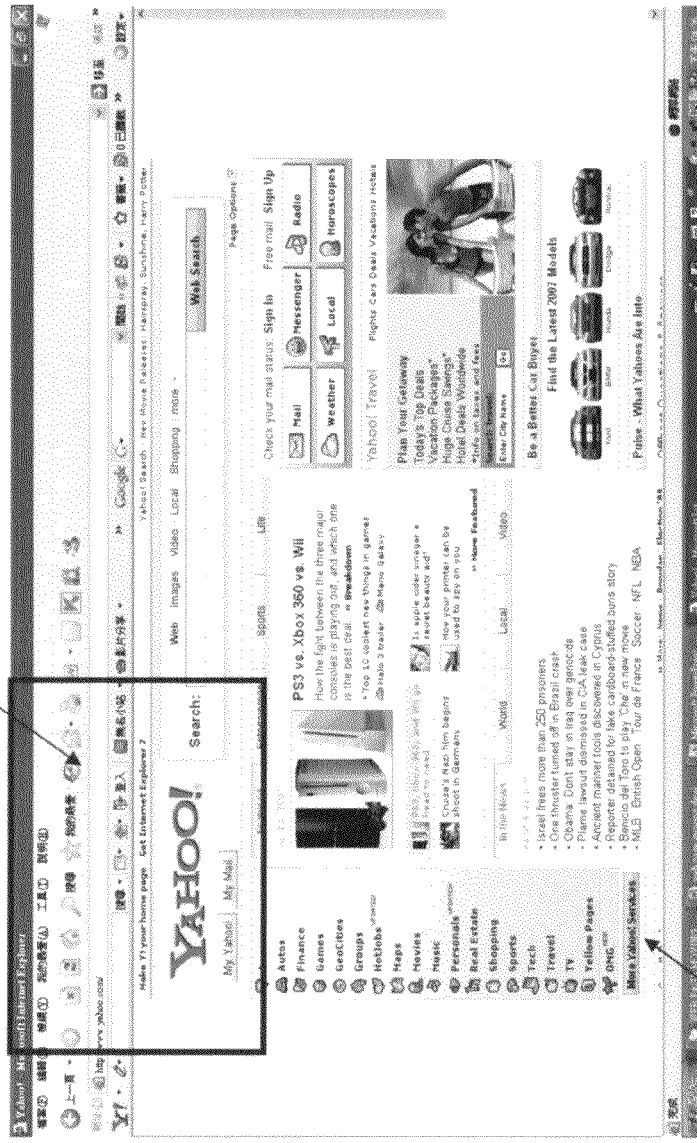
Figures 1, 15:
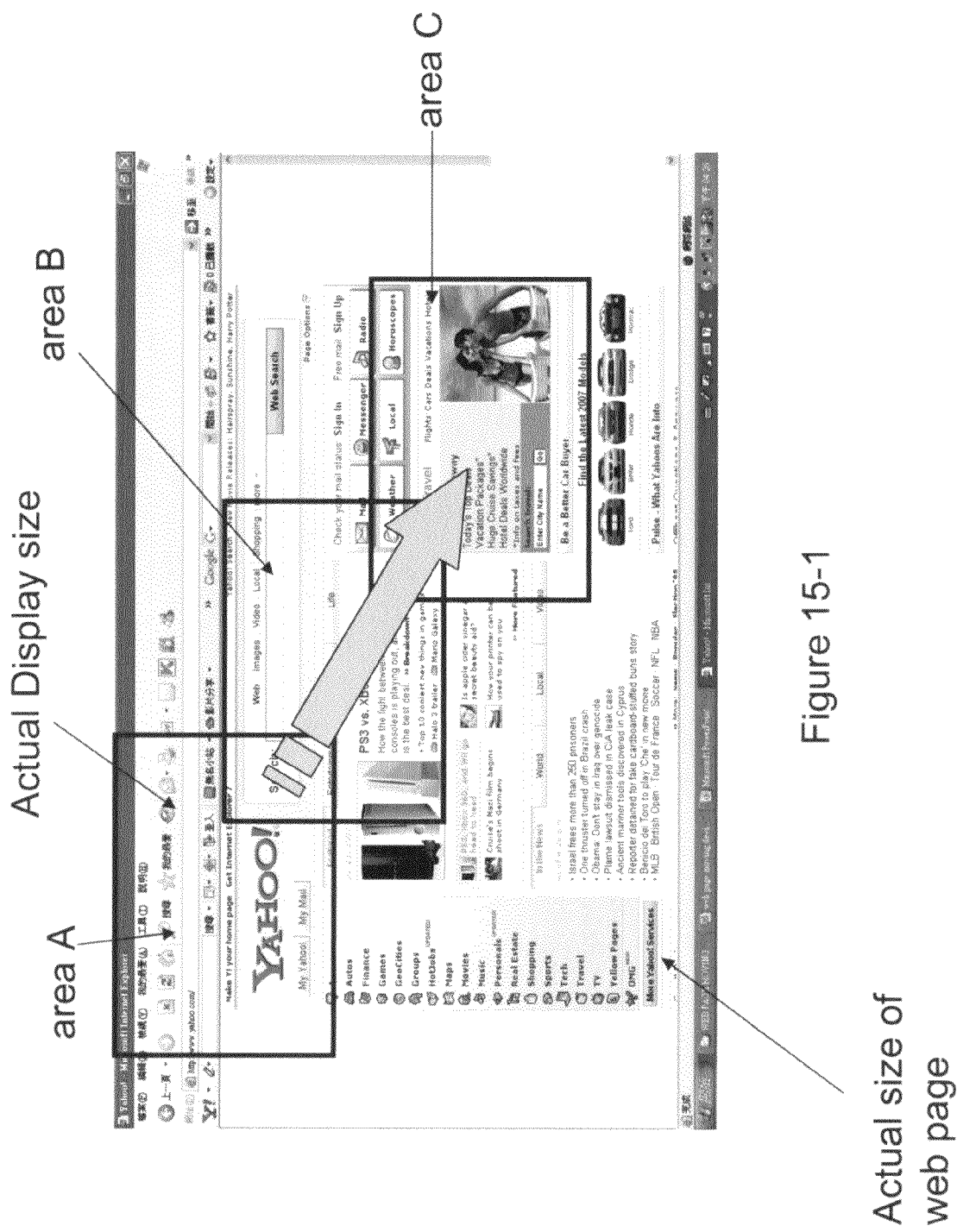
Figures 2, 15:
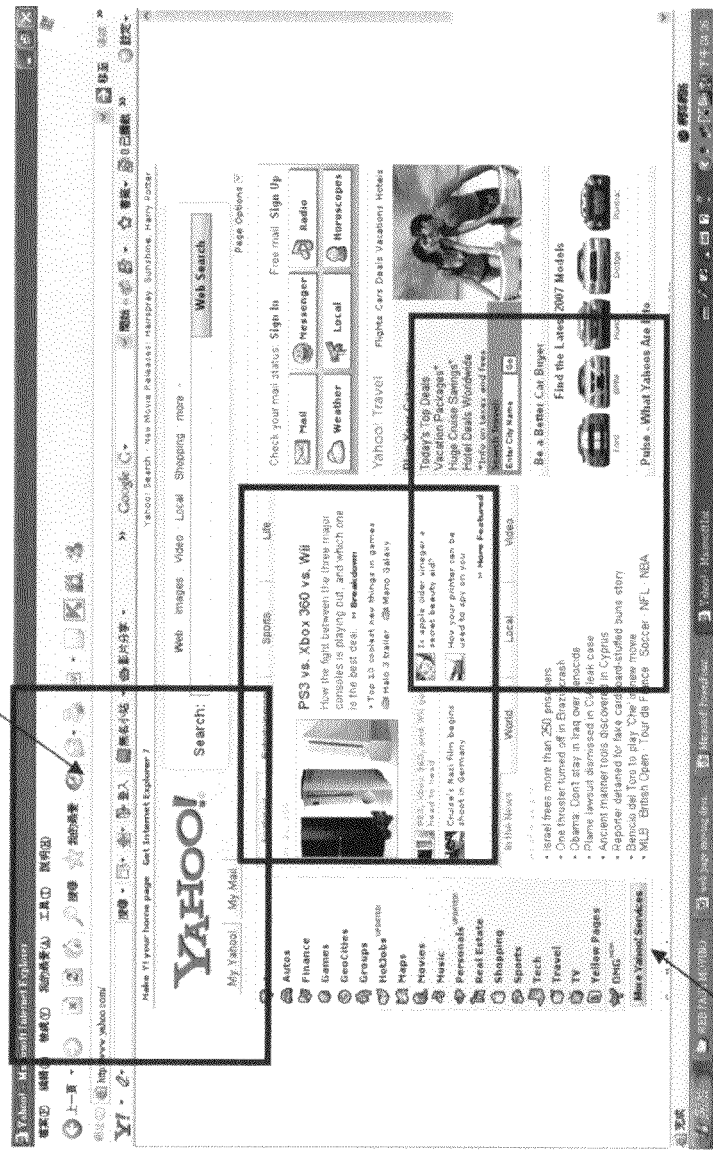

The signals generated at the sensing points may be used to determine how the user would like to move the web page displayed on the display. By way of example, each portion of the hand in contact with the device produces a contact patch area. Each of the contact patch areas covers several sensing points thus generating several signals. The signals may be grouped together to form a signal that represents how the user is moving the web page. In one embodiment, the difference between a current signal and a last hand signal may indicate the user's desire to implement a function of moving webpage. A significant difference indicates the user's desire to implement a function. Changes between contact patch areas may further indicate the particular moving signal. In mapping, the touch surface is divided into one or more button zones that represent regions of the device that when selected implement the particular button function associated with the button zone. The button zone having the contact patch area with the most significant change between first and second hand signals is the one that is typically implemented. The position and size of the button zones may also be customizable. For example, page back, page next and so on. The customization may be performed by the user and/or the device. It is because that the display is to small, the whole web page (or text, image) can not be seen and displayed by the display, as shown in FIG. 15. The display of PC may browser the almost the full page of the web information, however, it can not achieve the purpose by the portable device with small display. From FIG. 15, the user may only browser a part of the "actual web page", not full page of the web information due to the limitation of the size of the display. The other area outside the actual display window indicated in the FIG. 15 can not be viewed by the user. Conventionally, the user should click the scroll bar or keys to scroll the web page (or text, image, email) back and forth, right and left. It is very inconvenient to the user and the convention method is not user friendly design. However, the present invention provides the solution. The user may move his finger on the screen to introduce a user (or finger) movement for indicating where the user would like to view. For example, the user may move his finger and the movement is indicated by the arrow from area A to area C through area B to browse the part (area C) of the web page, as shown in FIG. 15-1. Thus, the user may move his figure on the display to review anywhere of the web page (image or text) while the display is too small, especially for the portable device, as shown in FIGS. 15-1 to 15-2.

Figure 14:
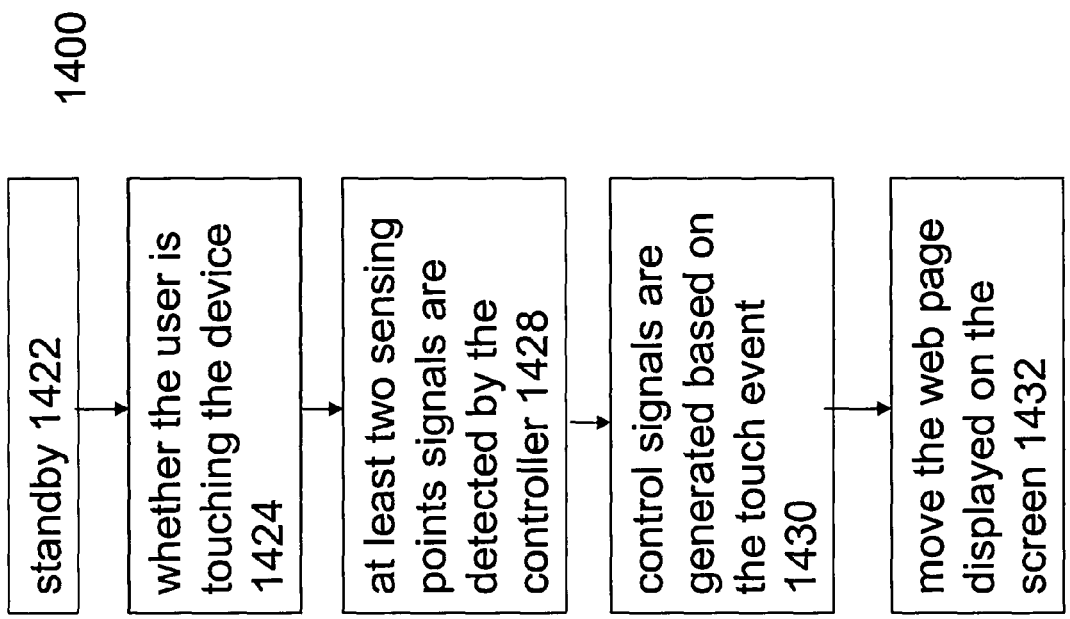
FIG. 14 shows a flow chart according to the present invention.

FIG. 14 is an operational method in accordance with one embodiment of the present invention. The method 1420 generally begins at block 1422 where the device is in standby. Standby generally implies that the device is in a state of readiness waiting for something to happen, i.e., a user initiating an action therewith. Following block 1422, the process flow proceeds to block 1424 where a determination is made as to whether the user is touching the device. This is generally accomplished with touch sensing device capable of generating signals when a hand nears the device and a control system configured to monitor the activity of the touch sensing device. If it is determined that the user is not touching the device, then the process flow proceeds back to block 1422 thereby keeping the device in standby. If it is determined that the user is touching the device, then the process flow proceeds to block 1426 where the user is determined.

In one embodiment, once the second location is determined, the process flow proceeds to block, at least two sensing points signals are detected by the controller. Following block 1428 the process flow proceeds to block 1430, where touch events are monitored, control signals are generated based on the touch event. The control signals 1432 may be used to inform the application software within the device to move the web page displayed on the screen instead of by moving the web page by scroll using keys, cursor or touch pen.

The processor can be implemented on a single-chip, multiple chips or multiple electrical components. For example, various architectures can be used for the processor, including dedicated or embedded processor, single purpose processor, controller, ASIC, and so forth. In most cases, the processor together with an operating system operates to execute computer code and produce and use data. The operating system may correspond to well known operating systems such as OS/2, DOS, Unix, Linux, and Palm OS. Memory provides a place to store computer code, the memory may include Read-Only Memory (ROM), Random-Access Memory (RAM), hard disk drive, flash memory and/or the like. The display is generally configured to display a graphical user interface (GUI) that provides an easy to use interface between a user of the electronic device and the operating system or application running thereon. The electronic device also includes a touch screen that is operatively coupled to the processor. The touch screen is configured to transfer data from the outside into the device. The electronic device also includes a sensing device that is operatively coupled to the processor. The sensing device may also be used to issue web page moving commands.

Examples of hand held devices include PDAs, Cellular Phones, Media player, Game players, Cameras, GPS receivers and the like. Therefore, the user may move the web page, image or document displayed on the page by directly moving the finger on the sensing array. The user may move the webpage, text, image, icon shown on the display directly by hand or user finger.

Figure 16:
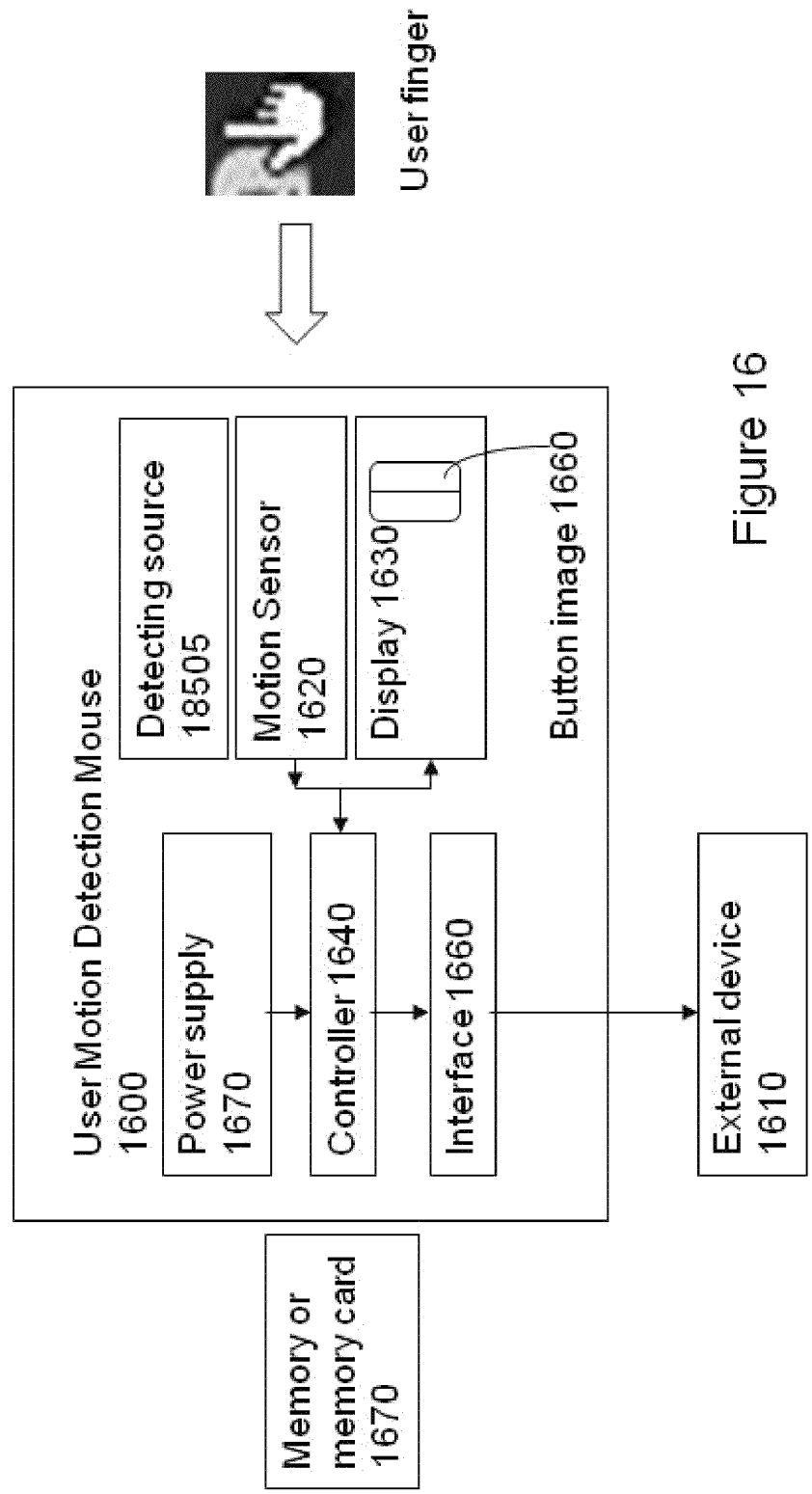
FIG. 16 show a mouse embodiment according to the present invention.

From above illustration, the present invention discloses alternative application more fully hereinafter with reference to the accompanying drawings, in which various exemplary embodiments of the invention are illustrated. This invention, may, however, be embodied in many different forms and should not be construed as limited to the embodiments set forth herein. These devices preferably may operate in a wireless technology mode using, for instance, RF, Bluetooth IEEE 802.11, WiFi, WiMax specification radio frequency technology. The peripheral devices may communicate with integrated wireless technology in the portable computer or PC. It may also include a security device such as a biometric device such as a finger-print scanner. FIG. 16 is a schematic view of a relatively slim mouse according to one exemplary embodiment of the present invention. The mouse 1600 is shown in a flat or collapsed configuration and is capable of fitting into a slot or port in a portable computer. This feature provides convenient storage and power recharge. The mouse 1600 may include a body portion which may house the electronic as well as functional areas for selecting functions in the computer, for instance, left click and right click functions. Since a device that will fit into a slot or port typically be only about 3-10 mm in height. It should be noted that the present invention is not optical mouse or mechanical mouse to detect the desk surface change. The present invention is user motion detection scheme. It is totally different from the conventional methodology.

The upper surface of the mouse 1600 includes touch panel with or without display. Please refer to FIG. 16, 16A and FIG. 16B. The present invention may perform its pointing function without the display 1630. It is because that the present invention is a mouse instead of display with touch screen. The display is not essential to the present invention. From the embodiment in [0055], the present invention may instruct the object without the display. The device 1600 is configured with a sensor array on the display which is not the display of an external device 1610. It may be formed on the upper surface of the mouse without the display. The sensor array 1620 is configured to detect the presence of an object such as a finger 1600A of the user as well as the location and pressure being exerted on the surface of the panel by the finger or palm of the hand. The user finger 1600A is placed over the sensor 1620. The finger skin surface with the finger print 1600B faces the sensor 1620, as shown in FIG. 16A and FIG. 16B. By way of example, the sensor array 1620 may be based on capacitive sensing, resistive sensing, surface acoustic wave sensing, thermal sensing and/or the like. Thus, as aforementioned, the finger 1600A locates and exerts on the sensor array 1620. The sensor array 1620 may further be based on pressure sensing such as strain gauges, force sensitive resisters, load cells, pressure plates, piezoelectric transducers or the like. The hand held mouse 1600 includes a display 1630 disposed within and viewable through an opening in the housing. The display 1630 provides visual information in the form of text, characters or graphics. By way of example, the display may correspond to a liquid crystal display (LCD), organic light emitting diodes (OLED), or a display that is based on electronic inks, electronic paper.

Please refer to FIG. 16, FIG. 16A and FIG. 16B, in order to generate user inputs, the finger motion mouse 1600 may include a sensing array 1620 that is a transparent input panel positioned in front of the display 1630. As [0054] indicated that the display 1630 is used to display virtual image buttons 16460 to acts as the function of left and right buttons of the conventional physical button. It should be noted that the display 1630 is not the display of the external device 1610. The present invention may instruct the object without the display as mentioned in [0055] below. The sensing array 1620 generates input signals when an object such as a finger is moved across the surface of the sensing array 1620, for example linearly, radially, rotary, etc., from an object holding a particular position on the array and/or by a finger tapping on the array. In most cases, the sensing array 1620 allows a user to initiate movements in a GUI by simply touching the sensing array 1620 via a finger. For example, the sensing array 1620 recognizes the touch and position of the touch on the display 1630 and an interpreting controller 1640 of the hand held electronic mouse 1600 interprets the touch and thereafter performs an action based on the touch event. In accordance with one embodiment, the sensing array 1620 is a multi-touch sensing device that has the ability to sense multiple points of contact at the same time and report the multiple touches to the controller 1640 of the handheld electronic mouse. In one implementation, the sensing array 1620 is a multipoint capacitive touch screen that is divided into several independent and spatially distinct sensing points, nodes or regions that are positioned throughout the display. The sensing points, which are typically transparent, are dispersed about the sensing array with each sensing point representing a different position on the surface of the display. The sensing points may be positioned in a grid or a pixel array where each pixilated sensing point is capable of generating a signal. The hand held electronic mouse 1600 may be designed to recognize gestures applied to the sensing array 1620 and to control the virtual object, such as cursor, icon, on a display of an external device (such as the computer) 1610 based on the gestures. The gestures may be made through various particularly finger motions. The external device 1610 may include a gesture operational program, which may be part of the operating system or a separate application.

The display may includes virtual image buttons 1660 to acts as the function of left and right buttons of the conventional physical button for selecting, clicking the virtual icon on the computer (external device) 1610 display or performing certain functions. While FIG. 16 illustrates some basic features of the mouse of the present invention, it may be advantageous to provide additional features for the user. The virtual image may includes virtual middle button 1620A in FIG. 16B that provides "middle button/scroll wheel" type functionality, a virtual scroll wheel 1620A may be provided, which includes the ability to trigger a button when a downward force is applied to create the similar functionality with respect to moving a scroll wheel forward and backward. It may also provide scrolling (on the computer screen) that may continue until the "touch" is released. All of the virtual buttons may serve the same function as buttons on a conventional standard mouse. Tapping the zone of virtual buttons provides additional functionality. A communication interface 1660 is coupled to the controller 1640 to transfer the signal to the computer 1610, thereby controlling the virtual object on the display of the external device 1610 without touching the display of the external device 1610. The controller could be a chip, processor, or an integrated circuit. The interface 1660 may be wired interface such as USB, IEEE1394 or fire wire, or wireless interface such as IEEE 802.11, WiFi, IR, WiMAX, blue-tooth. The power supply 1670 coupled to the controller 1670 and it could be provide by wired, wireless, battery or solar energy.

A further embodiment of the present mouse uses a relatively semiconductor devices take of the finger images as may as 1,500 pictures per second to replace the touch sensing array. The above embodiments mentioned that the finger 1600A is placed on the touch sensing array which is on the upper surface of the mouse housing as shown in FIG. 16A, if the sensor array in FIG. 16B is replaced by the image sensor in FIG. 16C, it means that the finger skin surface with finger print 1600B faces the image sensor 1620 for the sensor 1620 to capture the image of the finger print 1600B of the finger 1600A of the user. From [0051] of the present invention, it also indicates that the present invention may act as a fingerprint scanner. Thus, the image sensor 1620 of the present invention is introduced to capture the finger print 1600B image. The semiconductor devices are all located within the mouse and exposed from the upper surface of the mouse for capturing the images of the finger print 1600B of the finger 1600A when the finger is located on the sensors 1620. Therefore, the semiconductor device takes the finger print 1600B images as the reference to determine the movement of the cursor or the virtual object. The A complimentary metal-oxide semiconductor (CMOS) sensor captures the motion of the finger 1600A and the sensor sends each image to a digital signal processor which is able to detect changes in pattern in the images. CCD could be used to process the function. Based on the changes in pattern over a sequence of images, the processor determines how far the finger has moved on the surface of the mouse and sends the coordinates to the computer which moves the cursor or image based on the coordinates received from the mouse. A CMOS mouse may therefore provide improved tracking resolution, is devoid of moving parts and may be suitable for use on a variety of different surfaces. Therefore, the present invention provide a method of controlling an virtual object on a display of an external device by a mouse stand alone from the external device without touching the display comprising providing a mouse housing to receive a user motion detecting device attached on an upper surface of the mouse housing for capturing the finger print 1600B image change of the finger 1600A to determine the motion of user finger, wherein the user motion detecting device is not on the display of the external device under controlling; a detecting source 18505, such as light source, in the mouse housing is provided for the sensor 1620 to capture the images; a controller received in the housing for generating a control signal in responsive to the user finger motion detection; a communication interface is provided for connecting between the stand alone mouse and the external device; detecting the user finger motion by the user motion detecting device without touching the display, wherein the user finger motion detecting device includes an image sensor to capture images of the user finger when the finger skin surface having the finger print 1600B places over the CMOS or CCD image sensor 1620 within the mouse housing; the next step is to generate a control signal by analyzing the finger print 1600B image change of the captured user finger motion in responsive to the user finger motion detection, followed by controlling the virtual object on the display of the external device through the communication interface of the stand alone mouse based on the captured image change. The claimed invention is separated device from the external device, therefore, the present invention may keep a distance to remote control the virtual object of the display through the communication interface by wireless but keep the display clean. No finger print leaves on the display.

It is appreciated that these mouse may be stand alone device or be integrated into an electronic device such as a computer, notebook, keyboard, mobile phone, PDA, media player etc. Further, the present invention may includes a memory 1670 coupled to display and/or controller to store data, application (software) or information. If the application is media player, then, it may play audio (MP3) or video format (MP4). If the application is digital photo player or digital photo album, then it may display the photo or video. It could be function as flash drive if the memory includes nonvolatile memory. The memory could be build-in the mouse or it is a memory card inserted from a memory slot and coupled by a memory connector. The user may assess the file or open the file from the memory card. Therefore, it could function as photo display or digital memo. The method can be applied to keyboard.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

I claim:

1. A method of controlling a virtual object on a display of an electronic device by finger motion of a user without touching said display of said electronic device comprising:

providing a housing to receive a finger motion detecting device attached to an upper surface of said housing for detecting motion of a user finger wherein said finger motion detecting device is not on said display of the electronic device; a controller received in said housing for generating a control signal; a communication interface for connecting between said finger motion detecting device and said electronic device;

detecting said finger motion by said finger motion detecting device to generate a first control signal;

providing vocal control through a microphone and vocal control software of said electronic device to output a second control signal through voice recognition;

controlling said virtual object displayed on said display in response to said first or second control signal or a combination thereof through said communication interface without touching said display of said device; and wherein said finger motion device includes a CMOS or CCD sensor, and said finger motion detecting further includes a step of capturing an image of said finger, followed by analysis of image change of said finger motion by said CMOS or CCD sensor.

2. The method of claim 1, wherein said finger motion detecting device includes a CMOS or CCD sensor, and said finger motion detecting further including a step of capturing an image of said finger, followed by analysis of image change of said finger motion by said CMOS or CCD sensor; wherein said finger motion detecting further comprises providing illumination from said housing for said finger motion detection.

3. The method of claim 1, wherein a memory or memory card is contained in said housing.

4. The method of claim 1, wherein said finger motion detecting device is integrated into a keyboard.

5. A method of controlling a virtual object on a display of an electronic device based on analysis of image changes without touching said display comprising:

providing a housing to receive a finger motion detecting device attached to an upper surface of said housing for detection of motion of user finger, wherein said finger motion detecting device is not on said display of said electronic device; a controller received in said housing for generating a control signal; a communication interface for connecting between said finger motion detecting device and said electronic device;

detecting said finger motion by said finger motion detecting device;

generating a first control signal by analyzing image changes of said user finger motion by said controller in response to said finger motion detection;

detecting the user's facial expression by at least one image sensor when said user is in front of said device, analyzing the facial expression of said user to generate a second control signal; and outputting the first control signal, the second control signal or a combination thereof to control said virtual object on said display;

wherein said finger motion device includes a CMOS or CCD sensor, and said finger motion detecting further includes a step of capturing an image of said finger, followed by analysis of image change of said finger motion by said CMOS or CCD sensor.

6. The method of claim 5, wherein a memory or memory card is contained in said housing.

7. The method of claim 5, wherein said finger motion detecting device is integrated into a keyboard.

* * * * *

UNITED STATES PATENT AND TRADEMARK OFFICE
CERTIFICATE OF CORRECTION

| | |
|---|---|
| PATENT NO. | : 8,614,676 B2 |
| APPLICATION NO. | : 11/889602 |
| DATED | : December 24, 2013 |
| INVENTOR(S) | : Kuo-Ching Chiang |

It is certified that error appears in the above-identified patent and that said Letters Patent is hereby corrected as shown below:

Claims

Column 17, Line 26, Claim 2, REPLACE "CMOS or CCD sensor" with --controller--.

Column 17, Line 27 through Line 31, Claim 2, DELETE "wherein said finger motion detecting device includes a CMOS or CCD sensor, and said finger motion detecting further including a step of capturing an image of said finger, followed by analysis of image change of said finger motion by said CMOS or CCD sensor;".

Column 18, Line 30, Claim 5, REPLACE "CMOS or CCD sensor" with --controller--.

Signed and Sealed this
Tenth Day of November, 2015

Michelle K. Lee
*Director of the United States Patent and Trademark Office*